Patented Aug. 11, 1942

2,292,902

UNITED STATES PATENT OFFICE 2,292,902

MODIFYING CASTOR OIL

Alexander Schwarcman, Buffalo, N. Y., assignor to Spencer Kellogg and Sons, Inc., Buffalo, N. Y., a corporation of New York No Drawing. Application August 15, 1939, Serial No. 290,251

7 Claims. (Cl. 260—398)

This invention or discovery relates to modifying castor oil; and it comprises a method of modifying castor oil to make it miscible with mineral lubricating oils and also, with a more drastic treatment, of converting it into an excellent drying oil, wherein the castor oil is heated in the presence of a dissolved camphor sulfonic acid, the amount of catalyst present and the conditions of heating sometimes being merely enough to make the castor oil miscible with mineral lubricating oil and sometimes being sufficient to impart full drying properties; all as more fully hereinafter set forth and as claimed.

Castor oil contains ricinolein, the glyceride of ricinoleic acid. This differs from other oleic acids in that it carries an alcoholic hydroxyl group. Castor oil is of alcoholic character. It is more miscible with the alcohols than are other fatty oils and it is correspondingly less miscible with other oils and fats and with petroleum hydrocarbons. It does not mix readily with the ordinary petroleum lubricating oils. When blends are wanted, in order to make it miscible, it is often heated with various catalysts; mostly acids. By heating with almost any acid, miscibility can be conferred. The nature of the internal changes taking place in securing miscibility is not well understood and probably they are not simple. The alcoholic nature, however, is obviated in some way. In these methods it is an object to heat only enough to secure miscibility. Other changes are not wanted. It is difficult to preserve a light color.

By carrying the action of the acid further, the hydroxyl groups of the ricinolein are removed as H₂O leaving a new unsaturated bond. The oil is now drying; a property of course not wanted in lubricants. It is difficult, however, to catalyze the oil in such a way as to effect only this change; so as not to injuriously affect the color and desirable properties of the castor oil. Great technical difficulties have been encountered in the effort to convert castor oil into a really good commercially acceptable drying oil. Dehydroxylation can be effected by various specially treated bleaching earths; but these are difficult to remove afterwards.

In another and prior Patent No. 2,140,271, I have described and claimed a way of effecting a clean conversion of castor oil into a high grade drying oil of commercial quality. This way in substance is to catalyze the hot oil with sulfuric acid or sodium bisulfate in extremely small quantities supported on an absorbent earth or clay. Neither the clay nor the acid, in the quantity used, would alone effect the result wanted. It was my discovery that the two catalysts used together exercise an effect which is more than their sum. This compound catalyst of sulfuric acid or sodium bisulfate carried by a clay gives good results, but after the action is effected, it is necessary to get rid of the suspended mineral matter. Properly used, however, the compound catalyst does not give discoloring effects, develop acidity or catalyze pyrolysis, and does give high grade drying oil of commercial quality.

The drying oil produced by the catalysis has much the character of tung oil and in varnishes and paints it dries to a more waterproof film than is given by linseed oil. The oil, however, does not have the annoying gelating action of tung oil and it can be heated, as in bodying, without the necessity for adulterants such as rosin or admixtures with linseed oil, etc.

I have now found that I can produce similar results and even a better quality of oil by the use of a trace of one of the camphor sulfonic acids. These happen to be soluble in hot castor oil, dissolving readily in castor oil at a comparatively low temperature, say 240° F. Few other acid catalysts, especially the organic acid compounds, will dissolve in castor oil. Most of the sulfonic acids carrying a long hydrocarbon side chain are soluble in other oils but not in castor oil. If used in catalyzing castor oil, either in making it miscible or in dehydroxylating, they must simply be kept stirred in. As a matter of fact, they are better used in ways analogous to that of my patented process; adsorbed in an earthy carrier.

Camphor sulfonic acid is effective in producing catalysis in amounts as small as 0.1 per cent by weight or less. Larger amounts may be used, but generally give no better results than amounts of the order of 0.1 per cent. On dissolving 0.1 per cent of commercial camphor sulfonic acid in castor oil at 240° F. and then heating, there is no noticeable action until the temperature reaches about 440° F. There is then a quick reaction, which is sometimes violent. This action is attended by an evolution of H₂O vapors. The whole body of oil effervesces and considerable care in operation is necessary. The camphor sulfonic acid is in solution in all parts of the body of oil and reaction may take place with some violence when the critical temperature is reached. The critical temperature is somewhere around 440° F. However, a large body of oil cannot be heated uniformly and suddenly to the critical temperature, and the conditions of heating on a commercial scale therefore afford control. After the conversion is complete, the oil can be cooled and neutralized if this be desired. The amount of acid is so small, however, that it does not noticeably change the acid value of the oil, nor is it harmful in varnishes and paints made with the aid of the new oil. It does not affect pigments. Mostly, it can be simply allowed to remain in the oil.

After the hydroxyl groups are removed, the oil can be bodied in the usual way; that is, by heating to temperatures of the order of 500° to 600° F. The presence of camphor sulfonic acid does not seem injurious in bodying; in fact it is my belief that the bodying is quicker in its presence than in its absence.

Camphor sulfonic acids are commercial products, being sometimes known as "Reychler's acids." Their exact structure is somewhat uncertain. Camphor is a bridged ring carrying a methyl side chain; the ring having six members including one CO group. Some formulae for "Reychler's acids" represent sulfonation as being in the methyl side chain while others represent the sulfonic group as being attached to a CH group adjacent the CO group. However, for the present purposes the structure is unimportant; the fact is that the commercial "Reychler's acids" are soluble in warm castor oil and have the described catalyzing action.

In a specific embodiment of the present invention, making castor oil readily miscible with lubricating oils, the castor oil is heated with 0.05 per cent camphor sulfonic acid to a temperature of 350° to 400° F. for 3 hours. The castor oil is made miscible without any substantial change in its acid value or other chemical constants. It does not acquire drying properties unfitting it for use as a lubricant.

In converting castor oil to a commercial drying oil analogous to tung oil and having much the same properties, to a batch of 2000 pounds of good, clean castor oil, camphor sulfonic acid is added in the amount of 2 pounds; this being 0.1 per cent. The oil is heated in the ordinary way and in the ordinary types of kettle. When the temperature reaches 240–250° F. the camphor sulfonic acid goes into solution. The oil is well stirred to make it uniform and then heated further. As the oil reaches a temperature somewhere around 440° F., energetic reaction takes place attended with the formation of steam bubbles. With a small batch and quick heating evolution of steam may be rapid and special precautions must be taken to avoid loss by priming. With larger batches, such as the one just stated, no special precautions are necessary. Heating under vacuum is not necessary, although it may be done. When the formation of steam bubbles ceases the oil may be cooled and given an alkaline wash to neutralize and remove the camphor sulfonic acid. This is not necessary, however, as previously stated. The oil may be marketed and used for most purposes without removal of the catalyst.

Although castor oil is a highly viscous oil, the product obtained by the catalysis is rather thin and mobile; somewhat resembling raw tung oil. For commercial purposes it is generally desirable to body it. Bodying may be carried to any extent desired, even to the thick body characterizing stand oils and lithographer's varnish. In bodying, the oil is heated to a temperature between 550° and 600° F. for some hours; the length of time depending on the body desired. The camphor sulfonic acid may or may not be removed prior to bodying, or it may be neutralized.

What I claim is:

1. In modifying castor oil, the process which comprises heating it in the presence of a minor amount of dissolved camphor sulfonic acid for a period at least sufficient to make the oil miscible with mineral lubricating oils.

2. In producing drying oil from castor oil, the process which comprises dissolving a minor amount of camphor sulfonic acid in the oil and heating the oil to a temperature of the order of 440° F.

3. The process of claim 2, wherein the camphor sulfonic acid is added to the oil in an amount of the order of 0.1 per cent by weight.

4. In producing drying oil from castor oil, the process which comprises dissolving a minute amount of camphor sulfonic acid in the oil, heating to a temperature around 440° F., continuing the heating as long as steam bubbles form, and thereafter bodying the oil by exposure to heat between 550° and 600° F.

5. The process of claim 4 in which the acid is removed prior to bodying.

6. The process of claim 4 in which the acid is neutralized prior to bodying.

7. The process of claim 4 in which the camphor sulfonic acid is present as such in the bodying stage.

ALEXANDER SCHWARCMAN.